L. B. WEBSTER.
DRILL GAGE.
APPLICATION FILED FEB. 17, 1920.

1,357,753.

Patented Nov. 2, 1920.

RIGHT HAND DRILLS — LEFT HAND DRILLS
6°, 12°, 18°, 24°

WITNESSES

INVENTOR
LAWRENCE B. WEBSTER.
BY
ATTORNEYS

UNITED STATES PATENT OFFICE.

LAWRENCE B. WEBSTER, OF CLEVELAND, OHIO.

DRILL-GAGE.

1,357,753.  Specification of Letters Patent.  Patented Nov. 2, 1920.

Application filed February 17, 1920. Serial No. 359,240.

*To all whom it may concern:*

Be it known that I, LAWRENCE B. WEBSTER, a citizen of the United States, and a resident of the city of Cleveland, in the county of Cuyahoga and State of Ohio, have invented a new and Improved Drill-Gage, of which the following is a full, clear, and exact description.

This invention relates to improvements in drill gages, an object of the invention being to provide a flexible transparent gage which can be positioned around a twist drill and the like, and which contains a scale or scales consisting of lines at different angles or degrees relative to one edge of the device, and which scale registers with line of the lip clearance of the drill to indicate the angle of the said line.

It has been demonstrated by ample tests that the power to drive twist drills and also their working life depends largely on the proper clearance being given the lip or cutting edge. Experience has shown that if this lip clearance is not sufficient, twist drills tend to break or split up the web, while if the lip clearance is too great, the angle of the cutting edge is so sharp that the lip chips and breaks easily.

The fact that the outside edge of the drill lip has a curve which is the periphery of the drill itself has made it very difficult to measure the angle of the lip clearance.

In addition to twist drills, many boring and cutting tools have curved cutting edges, the angles of which have an important bearing on the efficiency of the tool, and the curved peripheries of which make it very difficult to measure exactly the angle of lip clearance thereon.

An object of the invention is to provide an inexpensive device which overcomes the above referred to difficulties, and efficiently performs the functions intended.

With these and other objects in view, the invention consists in certain novel features of construction, and combinations and arrangements of parts as will be more fully hereinafter described and pointed out in the claims.

In the accompanying drawings—

My improved gage comprises a sheet 1 of celluloid or other flexible, transparent material, having a plane surface, the upper edge 2 of which forms one line of the angle to be measured.

A master line 3 is made on the sheet 1 perpendicular to the line of edge 2 and extending to said edge at a point centrally of the sheet 1.

On the sheet 1 at both sides of the line 2 radial lines 4 are provided forming right and left scales A and B, and said lines project at an angle to the edge 2 and converge at the point of juncture of the edge 2 and line 3.

The radial or angle lines 4 are provided with indicating numerals designating the angles or degrees represented thereby.

The sheet also preferably contains the captions, "Right hand drills" and "Left hand drills," indicating the use of the scales A and B.

A clip or other fastening device 5 is provided to connect and hold the ends of the sheet 1 together when the gage is in operative position.

It is obvious that the invention is not limited to the particular form of fastening device 1, as I may employ any such device as will removably connect the ends of the sheet.

Figure 1:
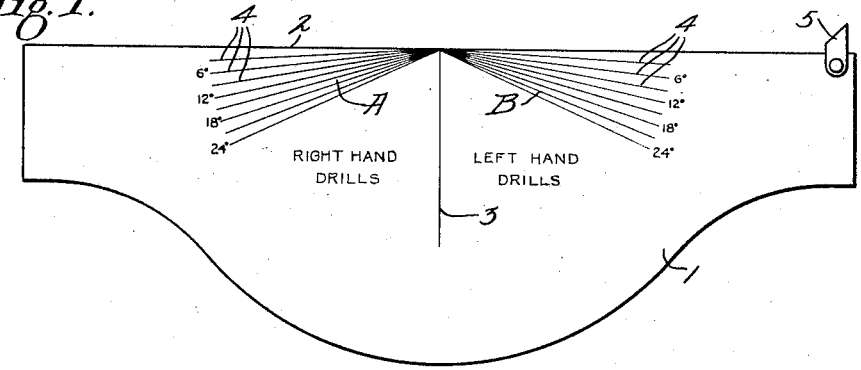
Figure 1 is a plan view illustrating my improved gage.
Figure 2:
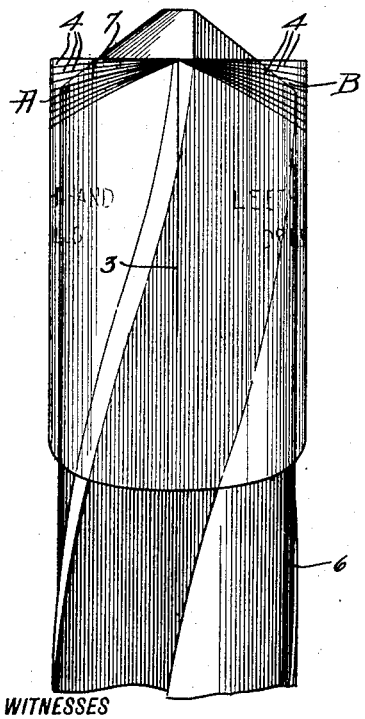
Fig. 2 is a view in side elevation showing the device in operative position.
Figure 3:
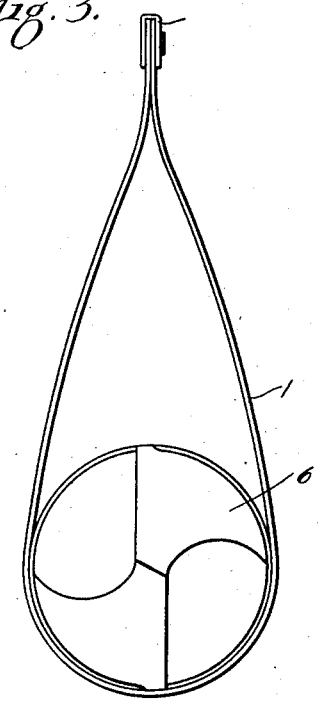
Fig. 3 is an end view of Fig. 2.

6 represents an ordinary twist drill, and Figs. 2 and 3 illustrate my improved gage in position thereon to measure the angle of the lip clearance, indicated by the reference character 7.

When the sheet 1 is held in cylindrical form around the drill, the line 3 will be parallel to the axis of the drill and the line or edge 2 at right angles thereto. By moving the device until one of the scale lines 4 exactly registers with the lip clearance line or edge 7 such scale line will show the exact angle of said line of clearance.

While I have referred to the use of my improved device in connection with a drill, it is obvious that its use is not limited thereto, but may be used in connection with various other tools. One convenient use would be to employ the same for determining the clearance angle on the round-nosed turning tool, such as used on engine lathes. Hence, I do not limit myself to any particular use of the device.

Furthermore, while I have illustrated scales consisting of a number of lines, it is obvious that I may employ only a single line or any other form of scale which will indicate the angle, and hence, in the employment of this term "scale" in the claims I use it in its broadest possible sense.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A gage of the character described, comprising a flexible transparent sheet, adapted to be positioned around a drill, said sheet having thereon an angle scale the lines of which are at different angles to one side of the sheet, and means for securing the ends of the sheet together.

2. A gage of the character described, comprising a flexible transparent sheet, adapted to be positioned around a drill, said sheet having thereon an angle scale the lines of which are at different angles to one side of the sheet, and a device removably securing the ends of the sheet together.

3. In a gage for measuring the angle of lip clearance on twist drills, the combination of a flexible transparent sheet having a master line thereon at right angles to one edge, and a series of radial lines—indicating angles—radiating from the point where the master line meets with one edge, substantially as described.

4. In a gage for measuring the angle of lip clearance on twist drills, the combination of a flexible transparent sheet having a master line thereon at right angles to one edge, and a series of radial lines—indicating angles—radiating from the point where the master line meets with one edge, and a clamp for holding the ends of the scale together when in use, substantially as described.

LAWRENCE B. WEBSTER.